G. D. VOLK.
UNIVERSAL JOINT.
APPLICATION FILED DEC. 5, 1919.
1,358,267.
Patented Nov. 9, 1920.
2 SHEETS—SHEET 1.
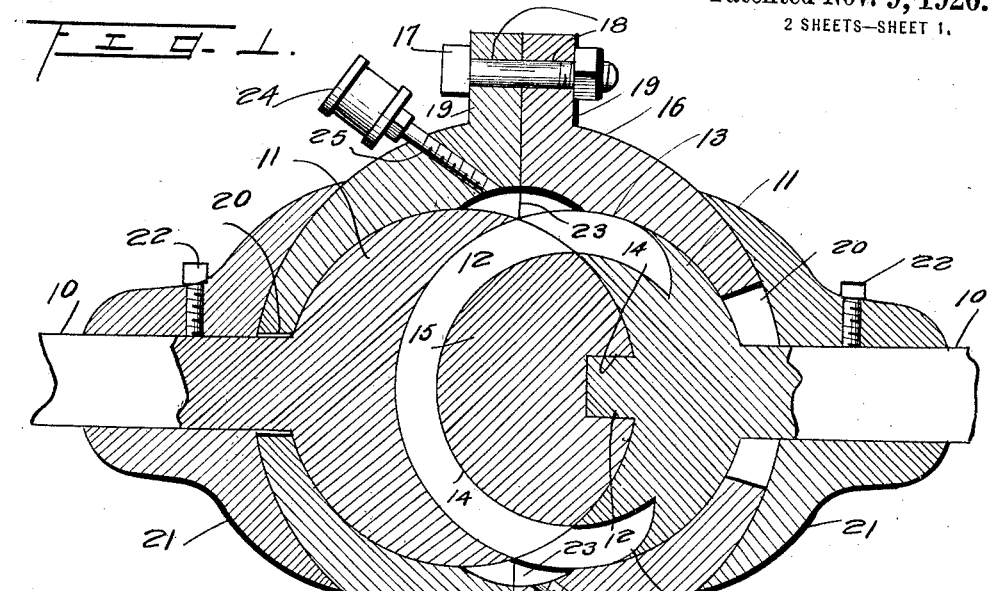
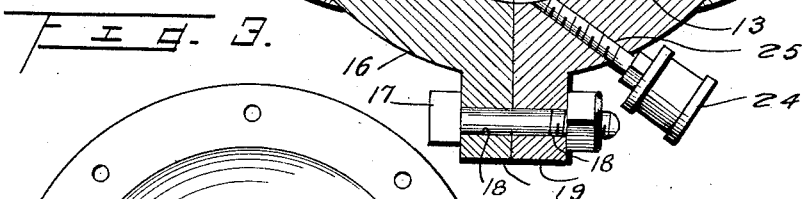
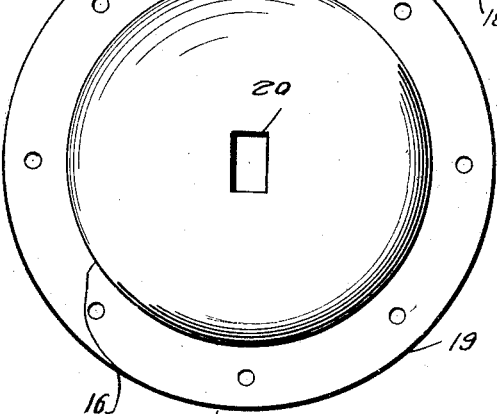
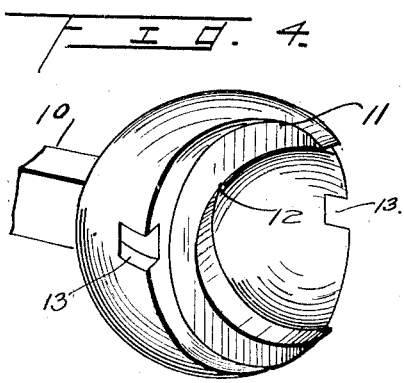
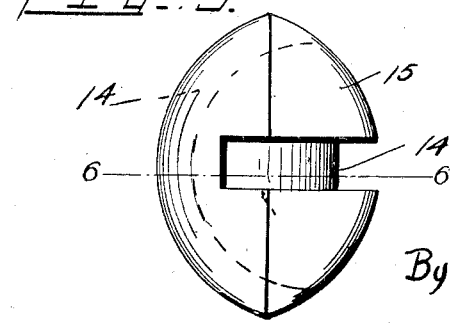
Inventor
G. D. Volk.
By [signature]
Attorney

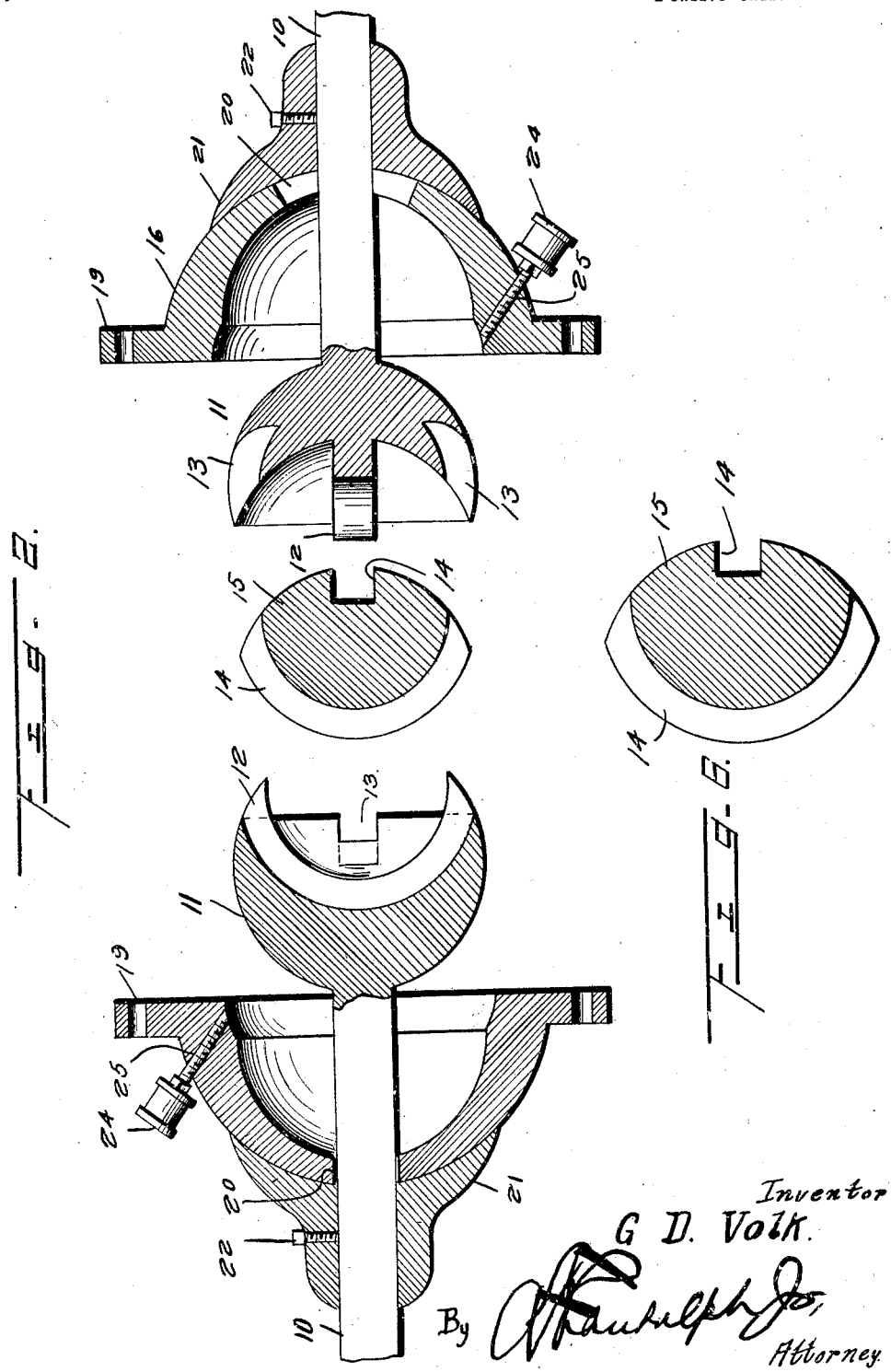

UNITED STATES PATENT OFFICE.

GEORGE DEWEY VOLK, OF CORRY, PENNSYLVANIA.

UNIVERSAL JOINT.

1,358,267.      Specification of Letters Patent.      Patented Nov. 9, 1920.

Application filed December 5, 1919. Serial No. 342,581.

*To all whom it may concern:*

Be it known that I, GEORGE DEWEY VOLK, a citizen of the United States, residing at Corry, in the county of Erie and State of Pennsylvania, have invented certain new and useful Improvements in Universal Joints; and I do hereby declare the following to be a full, clear, and exact description of the invention, such as will enable others skilled in the art to which it appertains to make and use the same.

This invention relates to an improved universal joint and the principal object of the invention is to provide an improved connection between the adjoining end portions of shaft sections so that the shafts may have the proper rotary movement when extending at an angle to each other.

Another object of the invention is to so construct this joint that a block in the form of an ellipsoid in cross section may be placed between the cups at the inner ends of the shaft sections and interlocked with the cups so that the blocks will rotate with the shaft.

Another object of the invention is to so construct this joint that there will be provided an oil groove or space about the block and free end portions of the cups when the joint is assembled.

Another object of the invention is to so construct this joint that it may be easily and quickly assembled or taken apart and to further so construct it that it will not be liable to get out of order when in use.

This invention is illustrated in the accompanying drawings, wherein:

Figure 1 is a sectional view showing the joint in longitudinal section.

Fig. 2 is a longitudinal sectional view showing the joint taken apart and in position for assemblage.

Fig. 3 is a view in elevation looking at the inner end of one of the casings.

Fig. 4 is a perspective view of a portion of one of the shafts together with the cup carried thereby.

Fig. 5 is a view showing the block which fits between the cups in side elevation.

Fig. 6 is a sectional view through the block taken along the line 6—6 of Fig. 5.

This joint is used for connecting the two shaft sections 10, each of which is provided at its inner end with a cup or socket 11 having a rib 12 formed therein and extending somewhat beyond the edges of the cup as shown in Figs. 1 and 2. The sockets are further provided with notches 13 positioned at right angles to the ribs and adapted to receive the ribs when the shafts are moved out of alinement and positioned at an angle to each other. That is to say, the grooves of one socket are adapted to receive the end portion of the rib of the second socket. These ribs fit into the grooves 14 formed in the block 15 or ball as it may be termed and therefore when the shafts are rotated the block or ball will be locked against independent rotation and therefore rotary motion can be transmitted from one shaft section to the other. It should be noted that this block is in the form of an ellipsoid in cross section as shown in Fig. 6 and when in place so fits into the socket 11 as to form a continuation of the socket. Therefore, if the block were placed in one socket it would form a continuation or auxiliary portion of this socket and together with the socket would constitute a ball at the inner end of the shaft section. This is clearly shown in Fig. 1. The casing for this joint is provided with two sections or bowls 16 which are connected by bolts or other removable fasteners 17 which pass through the openings 18 in the outstanding flanges 19 of the bowls. Slots 20 are formed in the bowls so that the shaft sections may have the proper sliding movement with respect to the casing when the joint is in use. It should be noted that this casing will be assembled with the slot of one bowl extending at right angles to the slot of the second. In order to cover the slots and prevent undue movement between the parts, there has been provided caps or covers 21 which fit upon the shaft sections and are held in the proper engagement with the bowls by the set screws 22.

From an inspection of Fig. 1 it will be seen that when this joint is assembled as shown a space 23 will be left between the adjoining edge portions of the bowls and the sockets thereby providing an oil space in which oil or grease may be fed through the medium of the grease cups 24 which communicate with the space 23 through the medium of passages 25. This space would naturally result from the construction shown if the walls of the bowls were of an even diameter but in order to increase this space the inner faces of the bowls have been cut away at their adjoining edges.

In assembling this joint the caps and bowls are first placed upon the shaft sections and the adjoining end portions of the shaft sections are brought together with the block or ball fitting into the sockets. The bolts 17 are then put in place and tightened and the caps moved into engagement with the casing and the set screws 22 tightened. Grease is now forced into the casing through the medium of the grease cup and the joint is assembled ready for use. If it is desired to take the joint apart for any purpose it is simply necessary to release the caps or covers and then remove the bolts 17 thus releasing the sections of the casing and permitting them to be moved along the shaft sections out of the way. Ready access may then be had to the sockets which may be separated if it is desired to remove the ball. This socket will therefore be composed of elements all of which are solid in construction and strong and durable and are not liable to break or get out of order.

What I claim is:

1. A universal joint comprising shaft sections each having a socket forming the major portion of a ball, a rib extending transversely through each socket and beyond the free end thereof, the rib of one socket extending at right angles to the rib of the second socket, said sockets having their outer faces provided with longitudinally extending grooves to receive the end portions of the ribs when the shaft sections are positioned at an angle to each other, a block positioned between the sockets and fitting into the same and provided with grooves to receive the ribs, the block being substantially an ellipsoid in cross section and when placed in one socket forming the auxiliary portion of the ball at the end of the shaft section, a casing having sections fitting upon the shaft sections and having their adjoining end portions connected to retain the casing in position upon the sockets, the sections of the casing being provided with shaft section receiving slots extending at right angles to each other, and covers fitting upon the shaft sections and engaging the casing to cover the slots thereof and releasably held in set positions upon the shaft sections.

2. A universal joint comprising shaft sections having their adjoining end portions provided with sockets each forming the major portion of a ball and having their end portions cut out to provide cups, ribs extending transversely of the sockets through the cups with the rib of one socket extending at right angles to the rib of the second socket, said sockets being provided with grooves in their outer faces to receive the ribs, a block positioned between the sockets and fitting into the cups thereof and provided with grooves receiving said ribs, said block when placed within the cup of one socket forming the auxiliary portion of the ball at the end of the shaft sections, and a casing inclosing the sockets.

3. A universal joint comprising shaft sections having at their adjoining ends sockets each constituting the major portion of a ball, ribs extending transversely of the sockets, a block fitting between the sockets and provided with grooves receiving the ribs, the block when in place conforming to the contour of the sockets and forming the auxiliary portion of a ball for each socket.

4. A universal joint comprising shaft sections, a socket at the end of each section, a block positioned between the sockets and provided upon opposite faces with grooves extending at right angles to each other, ribs carried by the sockets and fitting into the grooves, a casing fitting about the sockets and having sections releasably connected and provided with slots receiving the shaft sections, and caps mounted upon the shaft sections and engaging the sections of the casing to cover the slots formed therein.

5. A universal joint comprising shaft sections, sockets at the adjacent ends of the shaft sections, a block fitting between the sockets and into the same and having interlocking engagement with the sockets, the casing fitting about the sockets and having its inner walls cut out to provide a lubricant pocket, means for feeding lubricant into the lubricant pocket, and caps mounted upon the shaft sections and engaging the casing.

In testimony whereof I affix my signature in presence of two witnesses.

GEORGE DEWEY VOLK.

Witnesses:
 JOHN EDWARD VOLK,
 RALPH SAMUEL HILL.